United States Patent [19]

Saroya

[11] Patent Number: 5,554,840

[45] Date of Patent: Sep. 10, 1996

[54] HYBRID CARD READER

[75] Inventor: Jagtar S. Saroya, San Pedro, Calif.

[73] Assignee: American Magnetics Corporation, Carson, Calif.

[21] Appl. No.: 207,298

[22] Filed: Mar. 7, 1994

[51] Int. Cl.$^6$ .................................................. G06K 7/06
[52] U.S. Cl. ........................................... 235/441; 439/260
[58] Field of Search ................................. 235/492, 495, 235/441, 444; 439/260, 76, 630

[56] References Cited

U.S. PATENT DOCUMENTS

| 4,724,310 | 2/1988 | Shimamura et al. | 235/441 X |
| 4,795,897 | 1/1989 | Chalendard | 439/260 X |
| 4,814,593 | 3/1989 | Reichardt et al. | 439/260 X |
| 4,839,509 | 6/1989 | Yasuma et al. | 439/260 X |
| 4,932,889 | 6/1990 | Bleier et al. | 439/260 |
| 4,936,790 | 6/1990 | De La Cruz | 439/260 |
| 5,051,566 | 9/1991 | Pernet | 235/441 |
| 5,091,618 | 2/1992 | Takahashi | 235/441 |
| 5,120,946 | 6/1992 | Hug et al. | 235/441 |
| 5,151,847 | 9/1992 | Rautenberg | 439/260 X |
| 5,161,992 | 11/1992 | Birch | 439/260 |

FOREIGN PATENT DOCUMENTS 3412453  10/1985  Germany ................................ 235/441

Primary Examiner—Donald T. Hajec
Assistant Examiner—Jeffrey R. Filipek
Attorney, Agent, or Firm—Herbert M. Shapiro

[57] ABSTRACT

The flex cable common to commercially available smart card readers and hybrid card readers is eliminated resulting in lower cost, longer lifetimes, and increased reliability. The flex cable is replaced by an assemblage of molded plastic piece parts which travel in the plane of the card movement and elevate along an axis normal to that plane. The assemblage comprises a collar which moves in the plane of card movement but in a manner to elevate a mating spring contact array carraige vertically with respect to that plane. The vertical movement of the carriage distorts spring contacts in a mating, fixed position spring contact array so that the spring contacts distort to achieve electrical connection to the contacts on the card.

4 Claims, 4 Drawing Sheets

HYBRID CARD READER

FIELD OF THE INVENTION

This invention relates to apparatus for reading a variety of cards used to initiate commercial transactions. Such cards include magnetic stripe cards and smart cards and the like, readers for reading both magnetic stripe cards and smart cards being referred to herein as hybrid card readers.

BACKGROUND OF THE INVENTION

Hybrid readers are presently commercially available from the assignee of the present patent application as Model-160. The structural components of such a hybrid reader as well as it's operation are described in copending patent application Ser. No. 07/971,190 filed Nov. 3, 1992 for the present inventor.

The hybrid reader disclosed in the above mentioned patent application includes a slot into which a smart card or a magnetic stripe card is inserted. A sensor, located near the mouth of the slot signals a controller that a card has entered the slot. The controller responds to interrogate the reader to determine if the card includes contacts (i.e. if it is a smart card). If the reader responds positively, the controller activates a latch which impacts upon the exposed edge of the card and controls the final positioning of the (smart) card with respect to terminals on a printed circuit board (PCB) positioned within the reader.

Model-160 employs a flex cable which comprises a pattern of conductive stripes formed on a Mylar™ or Kapton™ substrate as is well understood in the art. The flex cable is connected between the terminals on the PCB and the contacts which connect to the contacts on the card when the card is in position within the reader. The flex cable is common to all smart card readers and hybrid readers known to the applicant.

But readers employing flex cables are subject to breakdown and loss of data occurs as a result. Also, the readers are relatively expensive primarily due to the use of the flex cable. The relatively high cost is due to the fact that an extra connector is necessary to connect the cable to the PCB. Not only is the connector expensive but it is subject to breakage. The cable itself also is subject to breakage, in continuous use, and requires extra labor to manufacture.

BRIEF DESCRIPTION OF AN ILLUSTRATIVE EMBODIMENT OF THIS INVENTION

In accordance with the principles of this invention, the flex cable is replaced by an assemblage of three inexpensive and rugged piece parts which mate with one another to produce movement along the path of travel for the card for one of the three piece parts where that movement produces vertical movement of a second of the three piece parts. The vertical movement causes a change in the geometry of spring contacts in the third of the piece parts resulting in a reliable electrical connection between the PCB and the contacts on the smart card.

The first of the piece parts is a collar member, spring loaded and movable along the card path by the advancing card being inserted into the reader. The collar frames the second of the piece parts which is fixed in the plane of card movement but is free to move vertically, by engaging ramps on the collar as the collar is moved by the advancing card. The vertical movement of the second piece part causes the distortion of spring contacts in the third piece part which is fixed in position not only in the plane of card movement but also in the vertical direction. The distortion of the spring contacts urges the spring contacts into contact with the contacts on the card thus establishing electrical connections therebetween. This action mimics the action of the flex cable in permitting relative movement as a card advances in prior art systems, but without the use of the flex cable and thus without the cost and other problems resulting from that use.

DETAILED DESCRIPTION OF AN ILLUSTRATIVE EMBODIMENT OF THIS INVENTION

Figure 1:
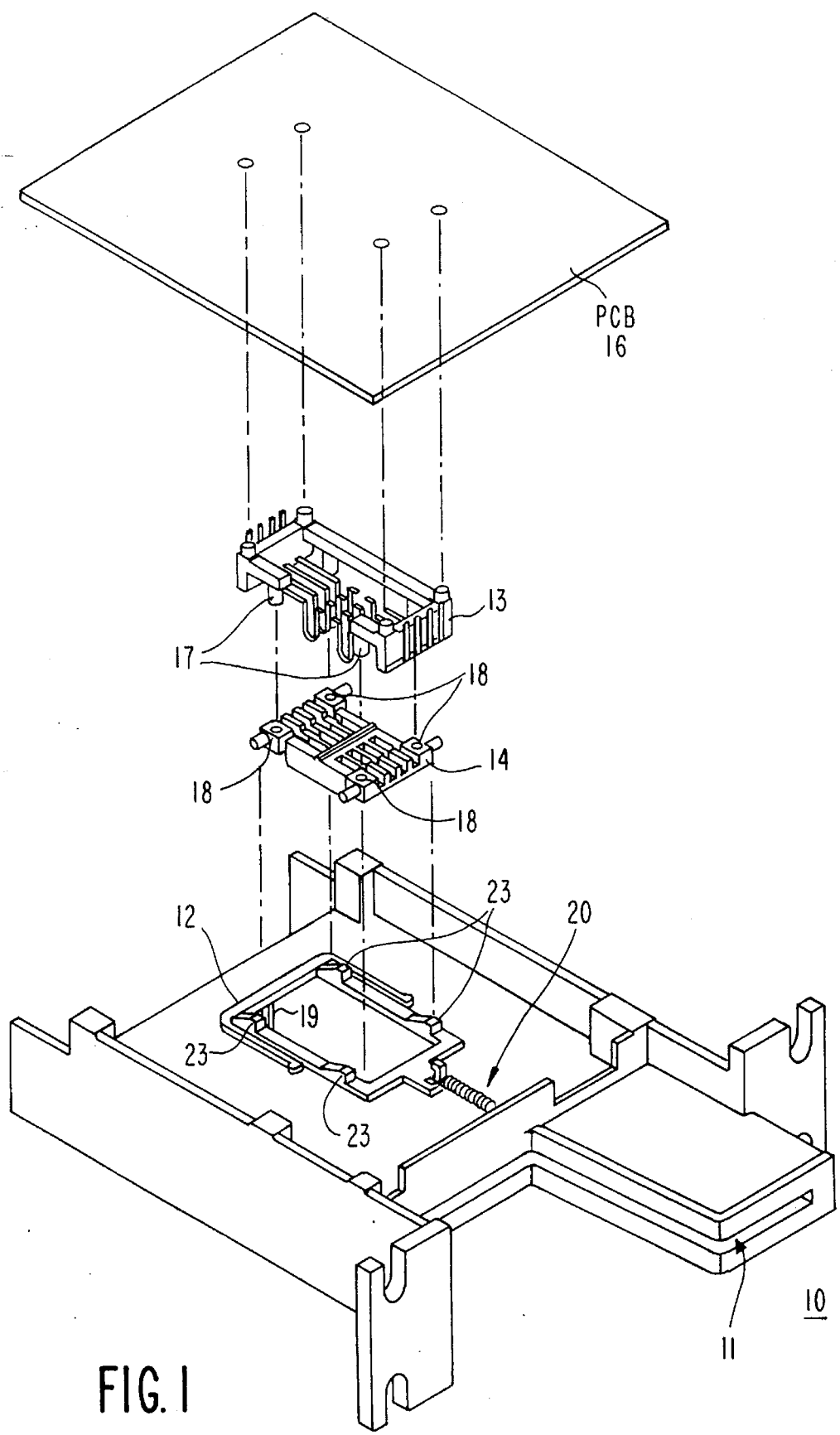
FIG. 1 is an exploded side view of a hybrid reader in accordance with the principles of this invention.

FIG. 1 is an exploded view of a smart card reader assemblage 10. The assemblage is shown without the normal housing which, if present, would reveal essentially only card input slot 11 to a user.

Figure 2:
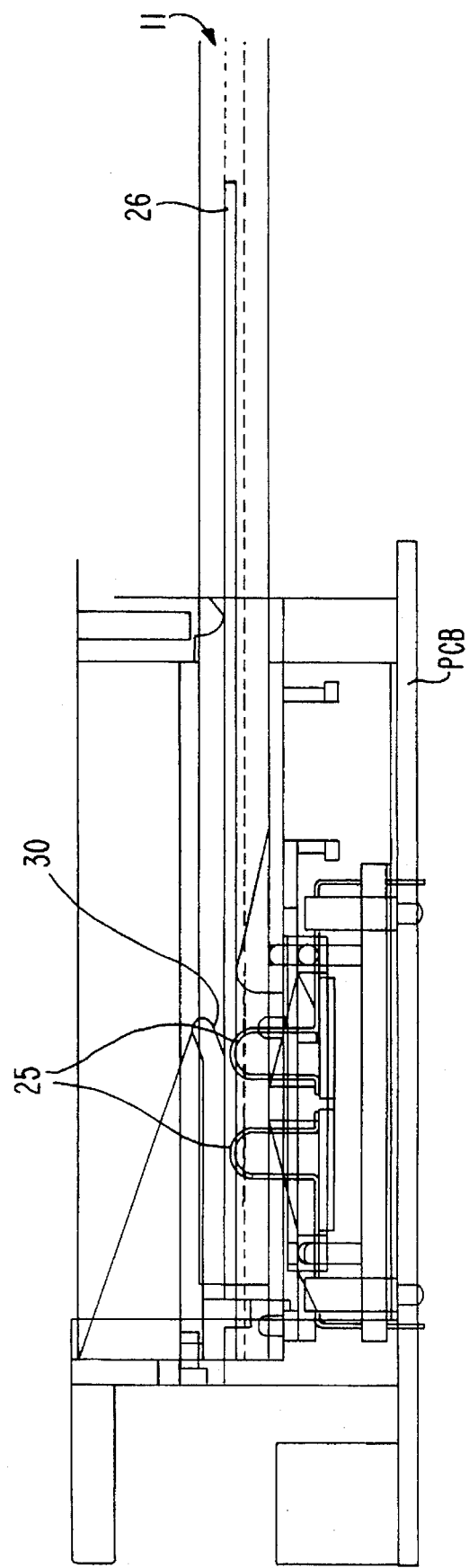
FIGS. 2 and 3 are side and top schematic views of the reader of FIG. 1.
Figure 3:
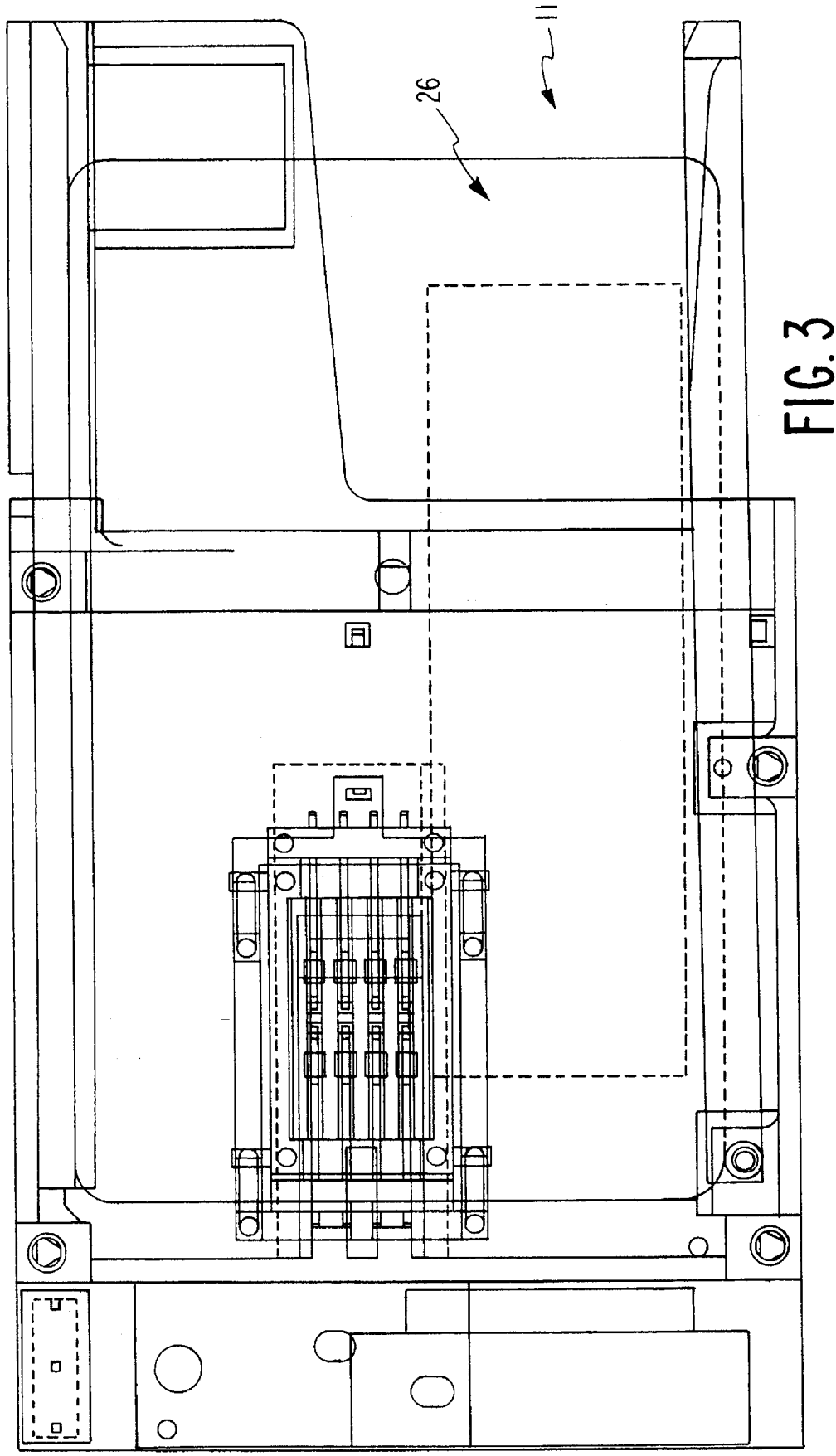

The reader includes a ramp slider subassembly comprising a collar 12, a spring contact array carraige 14 and a spring contact array 13 which comprise the three piece parts of the subassembly. The ramp slider subassembly also is shown in the side and top views of FIGS. 2 and 3 respectively where the view shown in FIG. 2 is obtained by rotating the top of the figure three 90 degrees towards the viewer. A smart card 26 introduced at 11 in FIG. 1 moves into a position in which contacts in the card surface correspond to the pins 25 of FIG. 2.

It is clear from the figures that the spring contact array 13 is secured to the PCB, designated 16 in the figures, and is not free to move at all with respect thereto. Spring contact array carraige 14 mates with array 13 and is aligned with that array by studs which mate with holes 18 in carraige 14. Thus, carraige 14 is permitted to move only vertically with respect to the path of card movement and by being thus confined moves to stress the spring contacts of array 13 when urged upwards as viewed.

Collar 12, on the other hand, is secured in the plane of card movement. The leading edge of an advancing card in that plane engages a stud 19, extending from the collar. The collar is attached to the reader housing by a spring 20 which allows displacement of the collar in the plane of card travel in response to the advancing card. The collar has ramps 23 on it's surface as is clear from the figures. When the collar is moved, the ramps engage the carraige and cause vertical movement of the carraige. This vertical movement urges the carraige into the mating spring contact array. Since the array itself is fixed in position only the spring contacts in the array can move and they are distorted by the carraige movement to engage the contacts on the card surface. The change in shape of the spring contacts caused by the vertical movement of the carraige can be seen by comparing the shapes of the spring contacts in FIG. 2 with the shape of those contacts at 25 in the enlarged view of FIG. 4.

Figure 4:
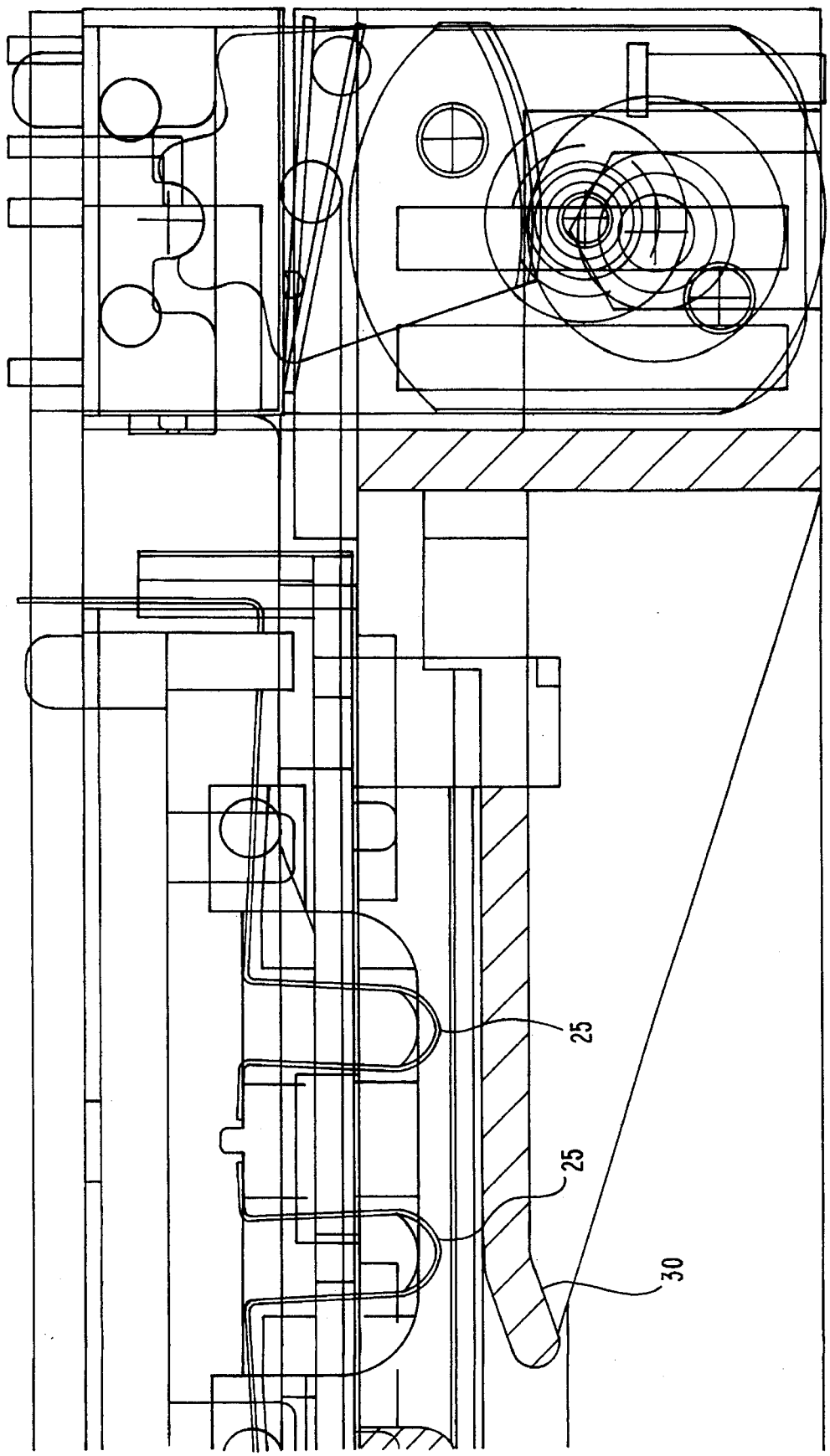
FIG. 4 is an enlarged schematic side view of the piece parts of FIG. 2 showing the movement of those parts in response to the insertion of a card into the reader of FIG. 1.

The advancing card also engages a lip 30, shown in FIGS. 2 and 4, which is operative to maintain the advancing card in a fixed position against the now stressed spring contacts.

The spring contacts are thus moved to engage the contacts on the card, in the absence of a flex cable, by a simple and inexpensive subassembly of molded plastic piece parts with spring wire inserts.

The PCB includes electrical conductors and mounted circuit components analogous to such boards in prior art readers. Once electrical contact is made by distorting the spring contacts herein, operation of the reader thereafter is exactly as prior art readers, employing flex cables, operate.

Another advantage of the spring contact arrangement over the flex cable is that the spring contact arrangement permits easy replacement in the field. The spring contact assembly can be fitted into a socket attached to the underside of PCB 16 in FIG. 1 and can be removed and replaced with a new assembly if the old one becomes damaged.

What is claimed is:

1. A card reader comprising a housing including a slot for accepting a smart card along a path in a first plane, said reader also including a printed circuit board bearing circuitry for interacting with data stored in a card inserted in said slot, said printed circuit board including a first set of electrical contacts corresponding to a second set of contacts on a smart card, said reader also including a subassembly for connecting said first set of contacts to said second set responsive to the movement of a smart card along said path, said subassembly including a collar member, a carraige and a spring contact array, said collar, carraige and array mating with one another, said collar member being spring loaded for movement only in the plane of said path, said spring contact array being fixed to said printed circuit board in alignment with said collar member, said collar member engaging a card advancing along said path and having ramps thereon for moving said carraige in a direction orthogonal to said plane, said array and said carraige being positioned and dimensioned so that the movement of said carraige distorts the spring contacts of said array into contact with contacts on a smart card fully seated in said reader.

2. A reader as set forth in claim 1 wherein said collar member includes a top surface bearing a plurality of ramps for moving said carraige in a direction orthogonal to the path of movement of a card when said collar member is moved by a card advancing along said path.

3. A reader as set forth in claim 2 wherein said carraige and said spring contact array are aligned with each other by studs in said array and mating holes in said carraige but are free to move with respect to one another along axes aligned with the axes of said holes.

4. A reader as set forth in claim 3 wherein said carraige is constrained by said studs and said collar for movement only along an axis orthogonal to said first plane.

* * * * *